United States Patent
Ishizaki

(10) Patent No.: US 12,236,219 B2
(45) Date of Patent: Feb. 25, 2025

(54) TUNING OPTIMIZATION TO REDUCE COMPILATION DELAYS

(71) Applicant: INTERNATIONAL BUSINESS MACHINES CORPORATION, Armonk, NY (US)

(72) Inventor: Kazuaki Ishizaki, Kotoh (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 17/535,188

(22) Filed: Nov. 24, 2021

(65) Prior Publication Data

US 2023/0161572 A1    May 25, 2023

(51) Int. Cl.
G06F 8/40     (2018.01)
G06F 8/41     (2018.01)

(52) U.S. Cl.
CPC .................. G06F 8/443 (2013.01)

(58) Field of Classification Search
CPC ...... G06F 8/443; G06F 8/4434; G06F 8/4441; G06F 8/4443
See application file for complete search history.

(56) References Cited

U.S. PATENT DOCUMENTS

| | | | |
|---|---|---|---|
| 6,189,141 B1 * | 2/2001 | Benitez | G06F 11/3636 714/E11.212 |
| 7,080,366 B2 | 7/2006 | Kramskoy et al. | |
| 7,716,657 B2 | 5/2010 | Inglis et al. | |
| 2001/0052117 A1 * | 12/2001 | Holzle | G06F 9/45516 717/141 |
| 2012/0117552 A1 * | 5/2012 | Krishnaiyer | G06F 8/41 717/160 |
| 2013/0339930 A1 | 12/2013 | Xu | |
| 2014/0047416 A1 * | 2/2014 | Pizlo | G06F 8/443 717/145 |
| 2016/0062878 A1 * | 3/2016 | Westrelin | G06F 9/4552 717/130 |
| 2016/0321046 A1 * | 11/2016 | Pizlo | G06F 8/443 |

OTHER PUBLICATIONS

Fluckiger, Olivier, et al. "Correctness of speculative optimizations with dynamic deoptimization", Proceedings of the ACM on Programming Languages. Jan. 2018, pp. 1-28.

Arnold, Matthew, et al. "Thin Guards: A Simple and Effective Technique for Reducing the Penalty of Dynamic Class Loading", InEuropean Conference on Object-Oriented Programming, Springer, Berlin, Heidelberg. Jun. 10, 2002, pp. 1-12.

(Continued)

Primary Examiner — Hanh Thi-Minh Bui
(74) Attorney, Agent, or Firm — Tutunjian & Bitetto, P.C.; Robert Richard Aragona

(57) ABSTRACT

Methods and systems for selective optimization include determining that a method, compiled with a speculative optimization, is executed with a frequency that exceeds a first threshold value, such that runtime recompilation of the method causes user delays. The method is recompiled without the speculative optimization, to avoid recompilation delays during runtime. The recompiled method is then executed.

16 Claims, 6 Drawing Sheets

(56) References Cited

OTHER PUBLICATIONS

Suganuma, Toshio, et al. "A region-based compilation technique for a Java just-in-time compiler", InProceedings of the ACM SIGPLAN 2003 conference on Programming Language Design and Implementation. May 9, 2003, pp. 1-12.
Detlefs, David, et al. "Inlining of virtual methods", InEuropean Conference on Object-Oriented Programming Springer, Berlin, Heidelberg. Jun. 14, 1999, pp. 1-20.
Anonymous. "Method and system for seamlessly scalable dynamic compilation", IP.com, Prior Art Database Technical Disclosure. Jul. 16, 2008, pp. 1-5.
Anonymous. "JIT Problem Determination for IBM SDK using-Xjit", IBM. Feb. 23, 2021, pp. 1-9.

* cited by examiner

TUNING OPTIMIZATION TO REDUCE COMPILATION DELAYS

BACKGROUND

The present invention generally relates to compilation optimizations, and, more particularly, to tuning the use of optimizations to avoid delays that result from inaccurate predictions.

Speculative optimizations can be used to improve the speed of compiled code, where code is optimized using predicted circumstances. These optimizations may be performed on the assumption that the predicted circumstances will generally prevail, leading to more efficient execution of the compiled code. However, in some cases the prediction turns out to be inaccurate, in which case the optimized code may be deleted and replaced by code that is optimized according to the actual circumstances.

SUMMARY

A method for selective optimization includes determining that a method, compiled with a speculative optimization, is executed with a frequency that exceeds a first threshold value, such that runtime recompilation of the method causes user delays. The method is recompiled without the speculative optimization, to avoid recompilation delays during runtime. The recompiled method is then executed.

A system for selective optimization includes a hardware processor and a memory that stores a computer program. When executed by the hardware processor, the computer program causes the hardware processor to determine that a method, compiled with a speculative optimization, is executed with a frequency that exceeds a first threshold value, such that runtime recompilation of the method causes user delays. The method is recompiled without the speculative optimization, to avoid recompilation delays during runtime. The recompiled method is executed.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
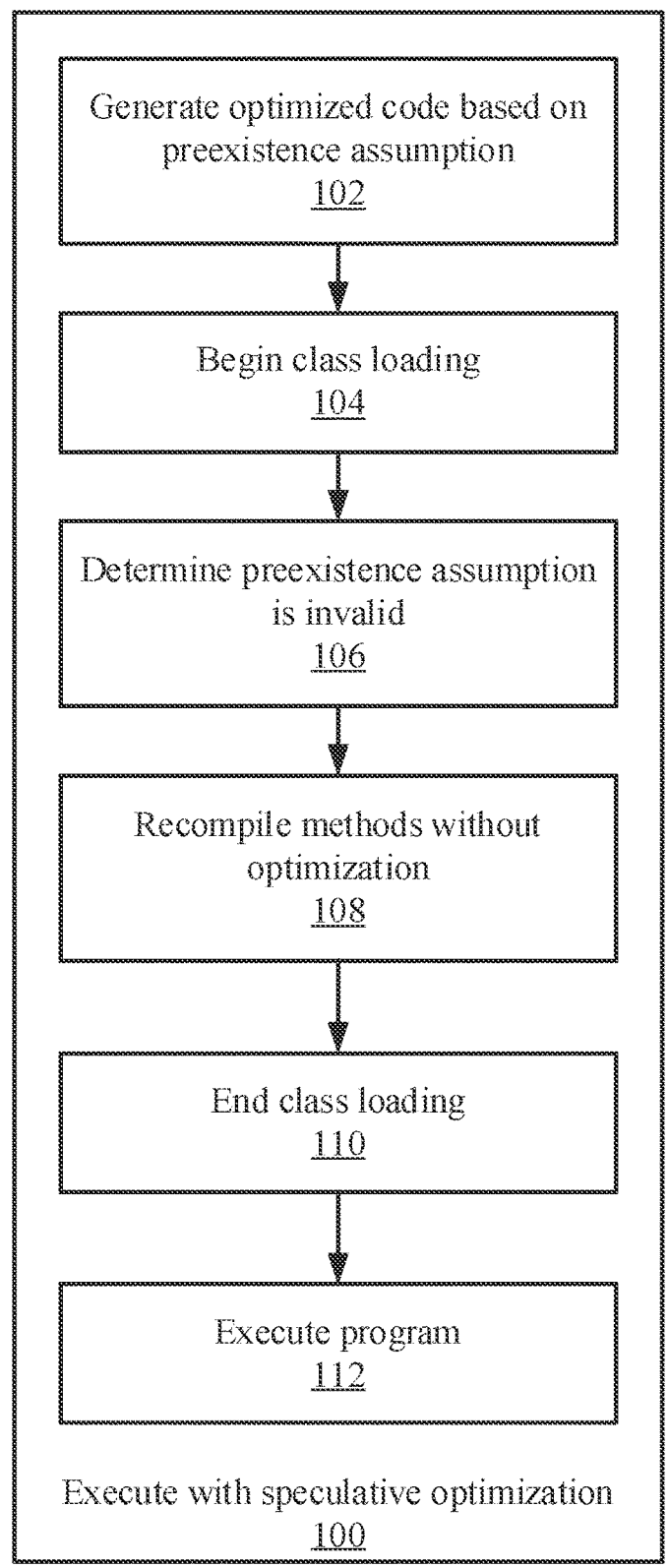
FIG. 1 is a block/flow diagram of a method for executing a method with selective speculative optimization, where methods may be recompiled without optimization if it is determined that a preexistence condition for the optimization is not valid, in accordance with an embodiment of the present invention.

Inaccurate predictions in speculative optimizations can cause substantial user-facing delays, as the user waits for various methods to be recompiled. By tuning whether speculative optimizations are performed, runtime overhead due to recompilation can be minimized. A profile may be generated for an application's performance, for example tracking how often certain optimizations are actually used and are beneficial, versus how often the code needs to be recompiled. Based on this profile, certain optimizations may be skipped, and lengthy recompilation delays may be avoided.

This problem may arise using, e.g., a preexisting optimization, which is a speculative optimization. When the assumption made at the time of the previous compilation is found to be invalid, for example during class loading at runtime, new code is generated without the optimization to ensure that the program can execute safely. Compiling the new code may cause a 3-5 second delay to the user, which can be a source of frustration. While the assumption underlying a speculative prediction is supposed to be safe in most circumstances, with exceptions expected to be uncommon, certain programs may trigger recompilation frequently, resulting in substantially delayed execution.

For example, with invariant argument preexistence compilation, code may be generated at compile time under the assumption that few cancellations will occur. At the time of class loading, methods are identified that need to be recompiled. The code associated with the identified methods is disabled, such as by deleting the optimized compiled code, and new compilation for these methods without the optimization is performed. Each method that is recompiled in this fashion incurs a delay, for example on the order of about 300 ms. The number of methods can be large, resulting in a long recompilation delay.

In the preexistence optimization, if a method m1 has a method call o.m2( ), and if the object o is allocated before the execution of an associated class cl begins, then the object o satisfies a preexistence condition for m1, because it exists before it is needed. If S is the set of classes that the preexisting object o can accept, and if m2 is the only method implementation in S, then speculative optimizations can be applied to generate code for m2. Such an optimization may include using a direct method call that omits a guard test regarding o, because the assumption is that the object o will already have been allocated before the method is called. Without implementing a guard test, such optimizations can improve runtime performance, as the compiled program need not perform unnecessary steps.

However, because the optimization is speculative, the preexistence assumption that was relied upon at the time of compilation may be found to be invalid at runtime. For example, when a method attempts to use the object o, the object may have another implementation of the method m2. In such an event, the method may need to be reimplemented with the guard test to ensure safe execution. Thus, there may be multiple implementations of the method m2 in S, and a version with the guard test may be needed before the class c1 can finish loading.

To accomplish this, at method compilation, the method m2 and the class set S may be recorded with a speculative optimization that uses preexistence, identifying a set of methods that may be deleted. Before the end of class loading, the code of the methods which have been identified may be discarded, and new code for the method may be generated and compiled, for example including the guard test.

To minimize the delays that result from inaccurate optimization predictions, the profile of previous application executions may be used to identify circumstances where speculative optimization should not be performed. Using such application profiles can help to minimize runtime overhead that results from the use of preexistence optimization, such as lengthy delays during class loading. For example, code with guard tests may be generated if it is known that the speculatively optimized code without the guard test is infrequently executed. This avoids the need for recompiling the methods during runtime, where they may cause lengthy delays. The non-optimized methods may be less efficient to execute than the optimized methods, but as long as time delays for correcting an erroneous optimization exceed the time savings provided by the use of speculative optimization, then the non-optimized methods should be used.

Additionally, the slow-down may be reduced by executing code on an interpreter or by regenerating code with the guard test. If the number of methods that will be regenerated at the time of class loading exceeds a threshold for the registration of the method at compile time, code generation with a guard test may be performed for the number of methods before the class loading occurs.

When code generation with a guard test is performed, different approaches are available. The old code may be immediately replaced by deleting it, thereby freeing memory for other uses, or the replacement of the code may be delayed until after the code is deleted at the time of class loading.

The threshold number of methods to be recompiled and the number of methods to generate without optimization can be determined using one or more of several different approaches. For example, the threshold may be set as a user-defined or externally defined parameter at the time the application is launched. If it is known that pause times by code generation are long, then the threshold and the number of unoptimized methods to generate may be adjusted appropriately. The threshold and the number of methods may further be based on the runtime profile of the application. If it is known that a large number of methods need to be recompiled at runtime, based on previous executions recorded in the profile, then the threshold may be reduced to decrease the delay time at class loading.

The compilation of methods without optimization (e.g., performing compilation to include guard tests) may be performed in an order that is determined according to one or more of a variety of factors. For example, code may be compiled from methods that run infrequently, that have a lower level of optimization, and/or that has been generated with guard tests in previous runs of the application, as recorded by the profile. This order may be determined after deleting the speculatively optimized code. Methods may further be recompiled if they were frequently executed or if they needed higher levels of optimization.

Referring now to FIG. 1, a method 100 of executing a software program with selective speculative optimization is shown for situations where the optimization's condition is not met. Block 102 begins by generating optimized code with a speculative optimization, for example based on a preexistence assumption. If the condition for the speculative optimization is found to hold at runtime, then the code with the speculative optimization may be executed without any difficulty.

As used herein, the preexistence condition may refer to the preexisting optimization in some implementations of the JAVA programming language. Although this optimization in this programming language is specifically contemplated, it should be understood that any appropriate speculative optimization may be used instead, where the conditions for the speculative optimization may not be met at runtime.

This is determined when the class loading begins at block 104. For example, in a speculative optimization that has a preexistence condition, a given class may be assumed to exist before a particular method is called. If this object exists at block 104, then the optimized code is executed. However, if block 106 determines that the preexistence assumption is invalid, a method has multiple implementations, then block 108 recompiles any methods that are needed to ensure safe execution. For example, if the optimized code of block 102 omitted a guard test, on the assumption that such a test would not be needed if the class existed, then that code may be recompiled by block 108 to include a guard test, to ensure safe execution. After the recompilation has been performed, block 110 finishes loading the class and block 112 executes the program.

Figure 2:
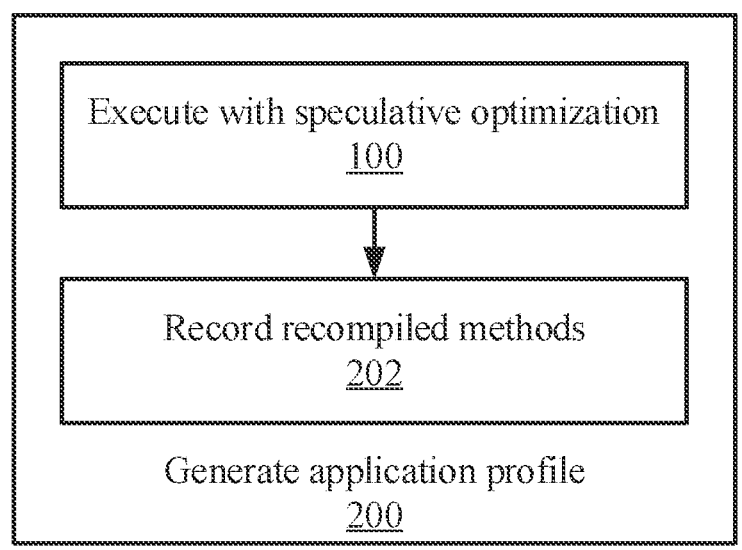
FIG. 2 is a block/flow diagram of a method for generating an application execution profile that characterizes the actual results of a speculative optimization, in accordance with an embodiment of the present invention.

Referring now to FIG. 2, a method 200 of generating an application profile is shown. As described above, the application is executed with speculative optimization at block 100. During execution, instances where a method's speculative optimization condition was found to be invalid (e.g., block 106) are recorded in block 202 to generate an execution profile of the application. This profile may record the identity of the methods that are recompiled and a number or frequency of such recompilation events.

Figure 3:
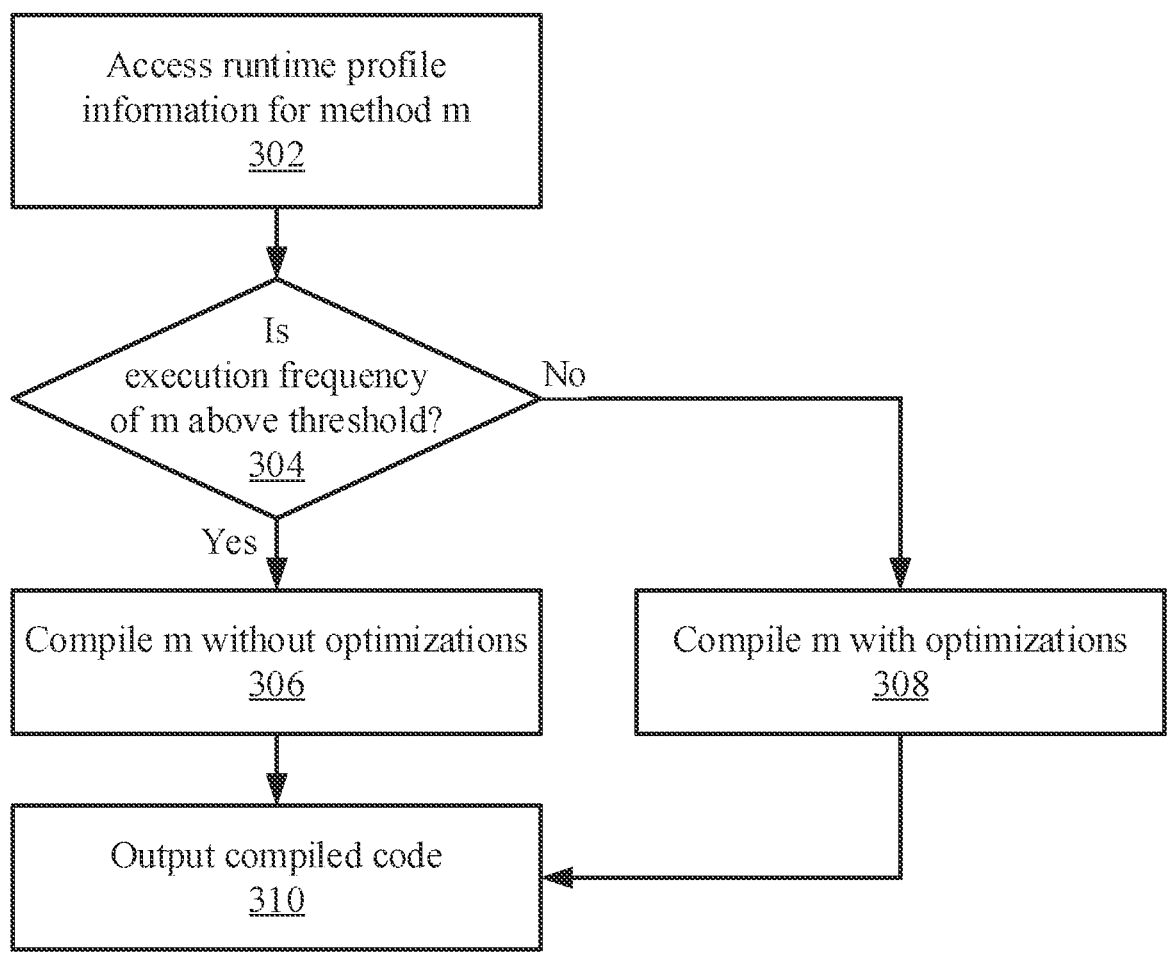
FIG. 3 is a block/flow diagram of a method for selectively compiling methods with optimization, based on information from an application execution profile, in accordance with an embodiment of the present invention.

Referring now to FIG. 3, a method for compiling a program with selective speculative optimizations is shown. Block 302 accesses runtime profile information for a method m. This runtime profile information may represent information about how many times and how frequently the method m needed to be recompiled during runtime of an application. The runtime profile information may be obtained in the manner described above, and may further (or alternatively) include information that is gathered from other sources, such as simulations and code analysis.

Block 304 determines whether the execution frequency of the method m is above a threshold, which may be set as described above. If so, then the method m may be compiled without optimizations in block 306. If the frequency is below the threshold, then block 308 may compile the method m with optimizations. Such optimizations may include, as described above, the omission of a guard test, with block 306 compiling the method with a guard test and with block 308 compiling the method without a guard test. Block 310 then outputs the compiled code.

Figure 4:
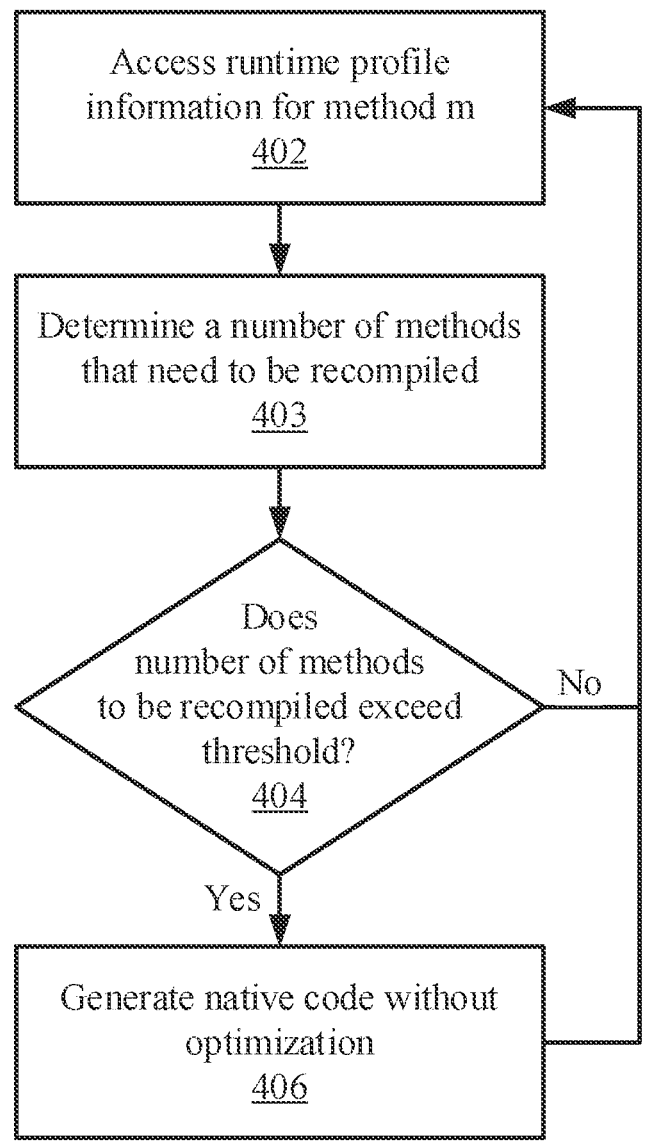
FIG. 4 is a block/flow diagram of a method for generating native code without optimization, based on a number of methods that need to be recompiled without optimization, in accordance with an embodiment of the present invention.

Referring now to FIG. 4, a method for mitigating the impact of incorrectly optimized code is shown. This may be performed in addition to the per-method approach described with reference to FIG. 3. Block 402 accesses the runtime profile information for the application. Block 403 determines a number of methods that would need to be recompiled. This number may be determined in any appropriate fashion. For example, external values may be set at the time the application is launched, such as by a user. If it is known that pause times by code generation are long, a relatively low number may be set. The number may further be set based on the runtime profile.

If the number of methods that need to be recompiled exceeds a threshold value in block 404, then block 406 generates native code for at least some of the methods. The native code may be generated with a guard test, for example, to compile the methods without the optimization. The methods that are compiled as native code may be selected as described above, for example selecting methods that run infrequently, that have a low level of optimization, and that have been generated with guard tests in previous application executions.

In some cases, preexistence optimization may be applied to a method m based on multiple classes. For example, classes A and B may both make use of this method. If the preexistence condition is not satisfied for class A at the time of loading sub-classes of class A, then the method m will be recompiled with the guard test for class A. After that, if the preexistence condition for class B is not satisfied at the time of loading sub-classes of class B, then the method m may be recompiled again with the guard test for class B.

Figure 5:
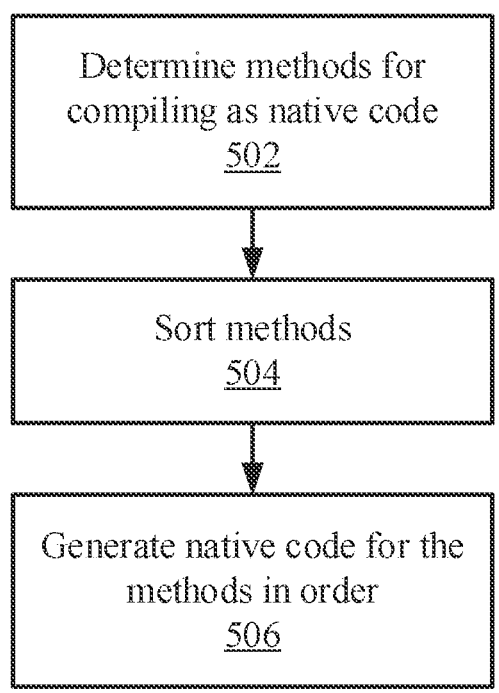
FIG. 5 is a block/flow diagram of a method for prioritizing the compilation of methods without optimization when compiling as native code, in accordance with an embodiment of the present invention.

Referring now to FIG. 5, a method of prioritizing methods for recompiling is shown. Block 502 determines a number of methods to compile as native code, for example in block 403. Block 504 sorts the methods according to any appropriate metric. For example, methods that are more frequently executed and/or methods with higher levels of optimization may be given higher priority. Block 506 then compiles native code for the methods in their sorted order.

Thus, if there are more candidate methods to be compiled than threshold value of block 404, the candidate methods may be split into multiple sets for compilation. This prioritization helps to split the methods into sets, for example with the higher priority methods being compiled as a group first, followed by groups of lower priority methods.

For example, if there are six candidate methods to be compiled without a guard test, and block 404 is using a threshold number of three methods, then the six candidate methods may be split into two sets, A and B, with A having the higher priority methods. The methods of set A may then be compiled first.

Figure 6:
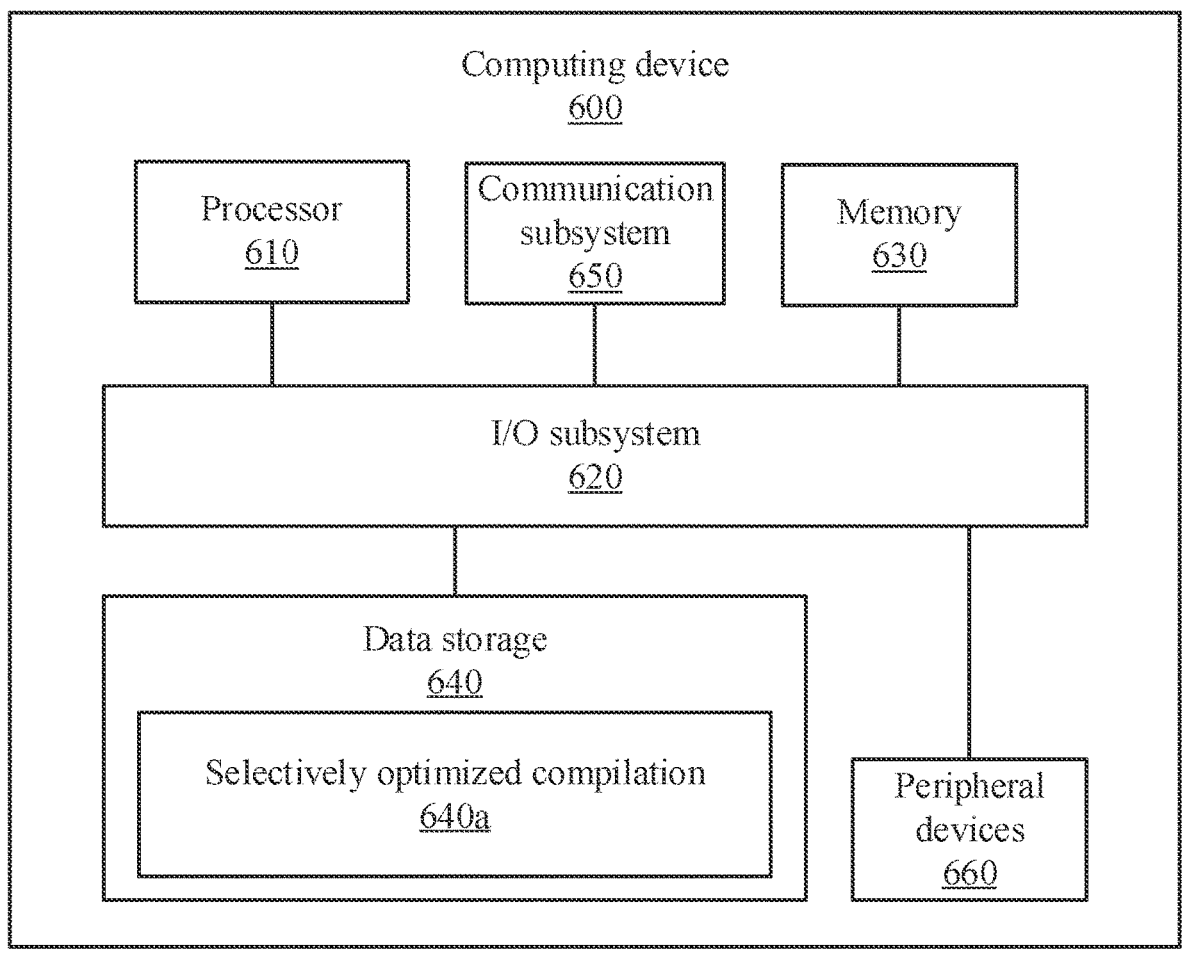
FIG. 6 is a block diagram of a computing device system that includes program code that can perform selectively optimized compilation, in accordance with an embodiment of the present invention.

FIG. 6 is a block diagram showing an exemplary computing device 600, in accordance with an embodiment of the present invention. The computing device 600 is configured to selectively compile code with optimizations.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for selectively optimized compilation. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of tuning optimization to reduce compilation delays (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A process for selective optimization, comprising:
determining that a method, compiled with a speculative optimization, is executed with a frequency that exceeds a first threshold value, such that runtime recompilation of the method causes user delays;
recompiling the method without the speculative optimization, which includes compiling native code by prioritizing methods by splitting methods into respective sets having a number of methods no more than a second threshold value, that is responsive to the determination that the method is executed with the frequency that exceeds the first threshold value, to avoid recompilation delays during runtime; and
executing the recompiled method.

2. The process of claim 1, wherein determining that the method is executed with the frequency that exceeds the first threshold value includes generating an application execution profile that includes method execution frequency information.

3. The process of claim 2, wherein generating the application execution profile includes executing the method, compiled with the speculative optimization, and recording information about the execution of the method, compiled with the speculative optimization, in the application execution profile that includes whether a condition for the speculative optimization was met.

4. The process of claim 1, further comprising determining that the number of methods, compiled with the speculative optimization, that are to be recompiled without the speculative optimization exceeds the second threshold value.

5. The process of claim 4, wherein the number of methods are recompiled in an order based on respective frequencies of execution and degrees of optimization.

6. The process of claim 1, wherein the speculative optimization includes a preexistence condition and omits a guard test.

7. The process of claim 6, wherein recompiling the method without the speculative optimization includes compiling the method with the guard test.

8. The process of claim 6, wherein the speculative optimization is a preexistence optimization in an implementation of JAVA® programming language.

9. A computer program product for selective optimization, the computer program product comprising a computer readable storage medium having program instructions embodied therewith, the program instructions being executable by a hardware processor to cause the hardware processor to:
   determine that a method, compiled with a speculative optimization, is executed with a frequency that exceeds a first threshold value, such that runtime recompilation of the method causes user delays;
   recompile the method without the speculative optimization, which includes compiling native code by prioritizing methods by splitting methods into respective sets having a number of methods no more than a second threshold value, that is responsive to the determination that the method is executed with the frequency that exceeds the first threshold value, to avoid recompilation delays during runtime; and
   execute the recompiled method.

10. The computer program product of claim 9, wherein determining that the method is executed with the frequency that exceeds the first threshold value includes generation of an application execution profile that includes method execution frequency information.

11. The computer program product of claim 10, wherein generating the application execution profile includes execution of the method, compiled with the speculative optimization, and recording information about the execution of the method, compiled with the speculative optimization, in the application execution profile that includes whether a condition for the speculative optimization was met.

12. The computer program product of claim 9, wherein the program instructions further cause the hardware processor to determine that the number of methods, compiled with the speculative optimization, that are to be recompiled without the speculative optimization exceeds the second threshold value.

13. The computer program product of claim 12, wherein the number of methods are recompiled in an order based on respective frequencies of execution and degrees of optimization.

14. The computer program product of claim 9, wherein the speculative optimization includes a preexistence condition and omits a guard test.

15. The computer program product of claim 14, wherein recompiling the method without the speculative optimization includes compiling the method with the guard test.

16. A system for selective optimization, comprising:
   a hardware processor; and
   a memory that stores a computer program, which, when executed by the hardware processor, causes the hardware processor to:
   determine that a method, compiled with a speculative optimization, is executed with a frequency that exceeds a first threshold value, such that runtime recompilation of the method causes user delays;
   recompile the method without the speculative optimization, which includes compiling native code by prioritizing methods by splitting methods into respective sets having a number of methods no more than a second threshold value, that is responsive to the determination that the method is executed with the frequency that exceeds the first threshold value, to avoid recompilation delays during runtime; and
   execute the recompiled method.

* * * * *